(12) United States Patent
Hwang et al.

(10) Patent No.: US 7,933,246 B2
(45) Date of Patent: Apr. 26, 2011

(54) BRIDGE-BASED RADIO ACCESS STATION BACKBONE NETWORK AND A METHOD OF TREATING SIGNALS THEREOF

(75) Inventors: Seong-Taek Hwang, Pyeongtack-si (KR); Jae-Hun Cho, Seoul (KR); Jong-Ho Yoon, Goyang-si (KR); Hoon Kim, Suwon-si (KR)

(73) Assignees: Samsung Electronics Co., Ltd., Maetan-Dong, Yeongtong-Gu, Suwon-Si, Gyeonggi-Do (KR); University-Industry Cooperation Foundation of Korea Aerospace University, Hwajeon-Dong, Deokyang-Gu, Goyang-Si, Gyeonggi-Do (KR)

( * ) Notice: Subject to any disclaimer, the term of this patent is extended or adjusted under 35 U.S.C. 154(b) by 898 days.

(21) Appl. No.: 11/890,174

(22) Filed: Aug. 3, 2007

(65) Prior Publication Data

US 2008/0031198 A1 Feb. 7, 2008

(30) Foreign Application Priority Data

Aug. 4, 2006 (KR) .................. 10-2006-0073841

(51) Int. Cl.
*H04W 4/00* (2009.01)
(52) U.S. Cl. ..................................... 370/331; 370/401

(58) Field of Classification Search .......... 370/331–334, 370/389, 401
See application file for complete search history.

(56) References Cited

U.S. PATENT DOCUMENTS

| 6,940,835 | B2 * | 9/2005 | Reza et al. ..................... 370/331 |
| 7,477,604 | B2 * | 1/2009 | Moon et al. ..................... 370/235 |
| 7,570,615 | B2 * | 8/2009 | Bolin et al. ..................... 370/329 |
| 2004/0057393 | A1 | 3/2004 | Bianchi et al. |
| 2007/0264979 | A1 * | 11/2007 | Park et al. ..................... 455/414.1 |
| 2008/0205393 | A1 * | 8/2008 | Jeong ............................. 370/389 |

FOREIGN PATENT DOCUMENTS

| KR | 2001-106404 | 11/2001 |
| KR | 2005-79407 | 8/2005 |
| KR | 2005-118773 | 12/2005 |
| KR | 2006-52112 | 5/2006 |

* cited by examiner

*Primary Examiner* — Phuc Tran
(74) *Attorney, Agent, or Firm* — Cha & Reiter, LLC (57) ABSTRACT

A method of treating signals in a bridge-based radio access station backbone network including a plurality of base station bridges (BSBs), with each BSB having a 2-tiered switch connected with a plurality of radio access stations. A plurality of SCBs (Site Core Bridges), each of having a 2-tiered switch for constituting the core network, includes the steps of buffering by the SCB a predetermined number of previously-transmitted frames when operating as a crossover bridge, and causing the SCB to retransmit selected ones of the buffered previously-transmitted frames to a terminal in response to a handover completion signal.

14 Claims, 7 Drawing Sheets

| | |
|---|---|
| DA | 6 |
| SA | 6 |
| New Etype(TBD) | 2 |
| L2 Sequence Number | 2 |
| Orignal Etype | |
| Data payload | |
| FCS | 4 |

FIG.7

| | | |
|---|---|---|
| Preamble | SOME BYTES ALLOCATED FOR L2 SEQ. FLAG | 8 |
| | DA | 6 |
| | SA | 6 |
| | Orignal Etype | 2 |
| | Data payload | |
| | L2 Sequence Number | 2 |
| | FCS | 4 |

FIG.8

BRIDGE-BASED RADIO ACCESS STATION BACKBONE NETWORK AND A METHOD OF TREATING SIGNALS THEREOF

CLAIM OF PRIORITY

This application claims priority under 35 U.S.C. §119 from an application entitled "Bridge-based Radio Access Station Backbone Network and a Method of Treating Signals Thereof" filed in the Korean Intellectual Property Office on Aug. 4, 2006 and assigned Serial No. 2006-73841, the contents of which are incorporated herein by reference in its entirety.

BACKGROUND OF THE INVENTION

1. Field of the Invention

The present invention relates to an extension of Ethernet protocol. More particularly, the present invention relates to a bridge-based radio access station backbone network structured by employing Ethernet technology and a method of treating signals thereof.

2. Description of the Related Art

Ethernet is a networking technology that was original designed for and most generally used with LANs (Local Area Networks). Over time, due to Ethernet's functionality and simple structure has caused Ethernet to become extremely popular, and Ethernet networking technology has extended its applicability for both very small LANs and WANs (Wide Area Networks).

Figure 1:
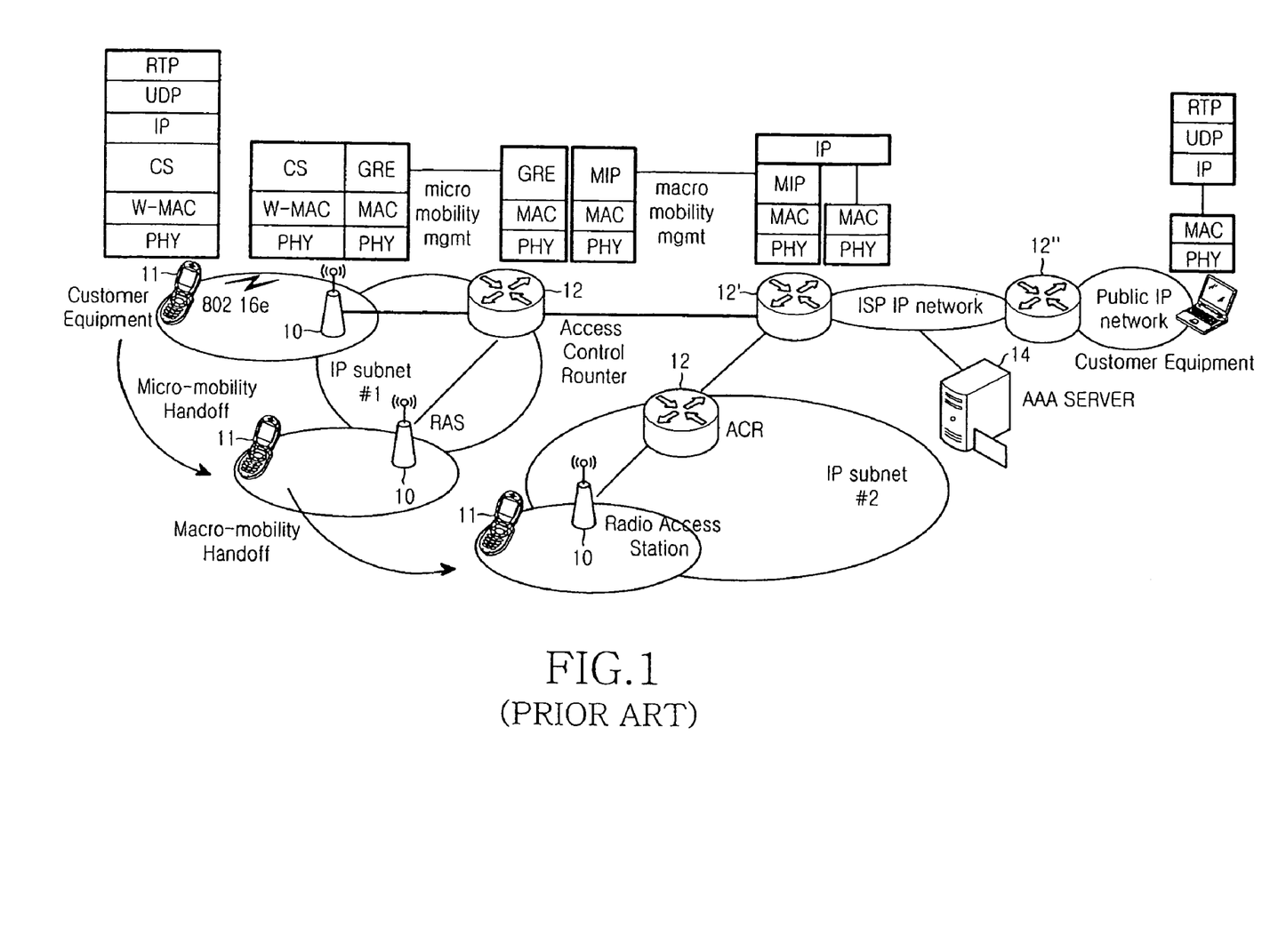
FIG. 1 is a schematic diagram for illustrating the structure of a conventional WiBro RAS backbone network.

FIG. 1 is an exemplary schematic diagram which illustrates the structure of a conventional WiBro (wireless broadband) radio access station backbone network. The WiBro in this example comprises a plurality of RASs (Radio Access Stations) 10 and a plurality of ACRs (Access Control Routers) 12. Besides, the WiBro network includes a home agent (not shown) for supporting the IP (Internet Protocol) mobility of a terminal, and an AAA server (Authentication, Authorization and Accounting) 14 for performing the authentication, authorization and accounting of the users and terminals in order to provide the network access and services for rightful persons.

The RASs 10 are allotted with respective service cells, wherein each cell provides communication services for a variety of equipment used by customers 11, such as a mobile communication terminal, PDA, and a notebook computer when any of the aforementioned examples are within the effective transmission area of a respective cell. The RAS 10 serves to mediate signals between the communications terminals 11 through a number of radio channels. In addition, the RAS 10 is connected through a wired channel to an ACR (Access Control Router) 12 forming an IP subnet. The signal wirelessly transmitted from the terminal 11 is packaged by the RAS 10 into an IP packet transferred to an upper ACR 12', which switches it to another ACR 12" adjacent to the target terminal according to the IP address thereof. Thus, the conventional RAS backbone network performs communication services by transmitting the IP packets to the target designated by an IP address.

However, the conventional RAS backbone network has been structured chiefly by employing 3tiered routers, which are relatively complicated in operation, resulting in ineffective network control. In addition, the 3-tiered routers also cause problems with delayed handover due to the problems that such routers have with handover operations.

SUMMARY OF THE INVENTION

The present invention provides a bridge-based RAS backbone network and a method of treating signals therein, in which the operation is effectively simplified so as to facilitate network control and result in faster handovers by employing 2-tiered Ethernet bridges as disclosed herein.

According to an exemplary aspect of the present invention, a method of treating signals in a bridge-based radio access station backbone network includes a plurality of base station bridges (BSBs), each of which are comprised of 2-tiered switches connected with a plurality of radio access stations; additionally, a plurality of SCBs (Site Core Bridges) are each comprised of 2-tiered switches for constituting the core network. A method of operation comprises the steps of causing each of the SCB to buffer a predetermined number of previously-transmitted frames when operating as a crossover bridge, and causing the SCB to retransmit selected ones of the buffered previously-transmitted frames to a terminal in response to a handover completion signal.

According to another exemplary aspect of the present invention, a bridge-based radio access station backbone network system comprises a plurality of base station bridges (BSBs), each BSB comprising a 2-tiered switch connected with a plurality of radio access stations; a plurality of SCBs (Site Core Bridges), each SCB comprising a 2-tiered switch for constituting the core network, the SCBs being connected with a part of the BSBs and transferring frames to each other in a MAC-in-MAC connection; and an Handover Location Register (HLR) server for managing the structural information of the network constituents by registering in table format the IP and MAC addresses of the terminals existing in the network and the addresses of the SCBs to which the terminals belong; wherein each of the SCBs detects a target terminal requested for communication by a terminal existing in its own site from the HLR server so as to transmit a frame to the SCB to which the target terminal belongs, or to the external default router, and buffers a predetermined number of previously-transmitted frames when operating as a crossover bridge, and retransmits selected ones of the buffered previously-transmitted frames to a terminal in response to a handover completion signal.

BRIEF DESCRIPTION OF THE DRAWINGS

The above features and advantages of the present invention will become more apparent from the following detailed description when taken in conjunction with the accompanying drawing in which.

DETAILED DESCRIPTION OF THE INVENTION

Now, embodiments of the present invention will be described herein below with reference to the accompanying drawings. It is to be understood by a person of ordinary skill in the art that the examples shown and described herein are for illustrative purposes and not to define the limits of the invention. A person of ordinary skill in the art also appreciates that various configurations, substitutions, etc. could be made to the drawings shown and described herein, all of which would be within the spirit of the invention and the scope of the appended claims. In the drawings, the same or similar elements are denoted by the same reference numerals even though they are depicted in different FIGS. For the purposes of clarity and simplicity, information regarding well-known functions or constructions may not be described in detail when they would obscure the invention with unnecessary information.

Figure 2:
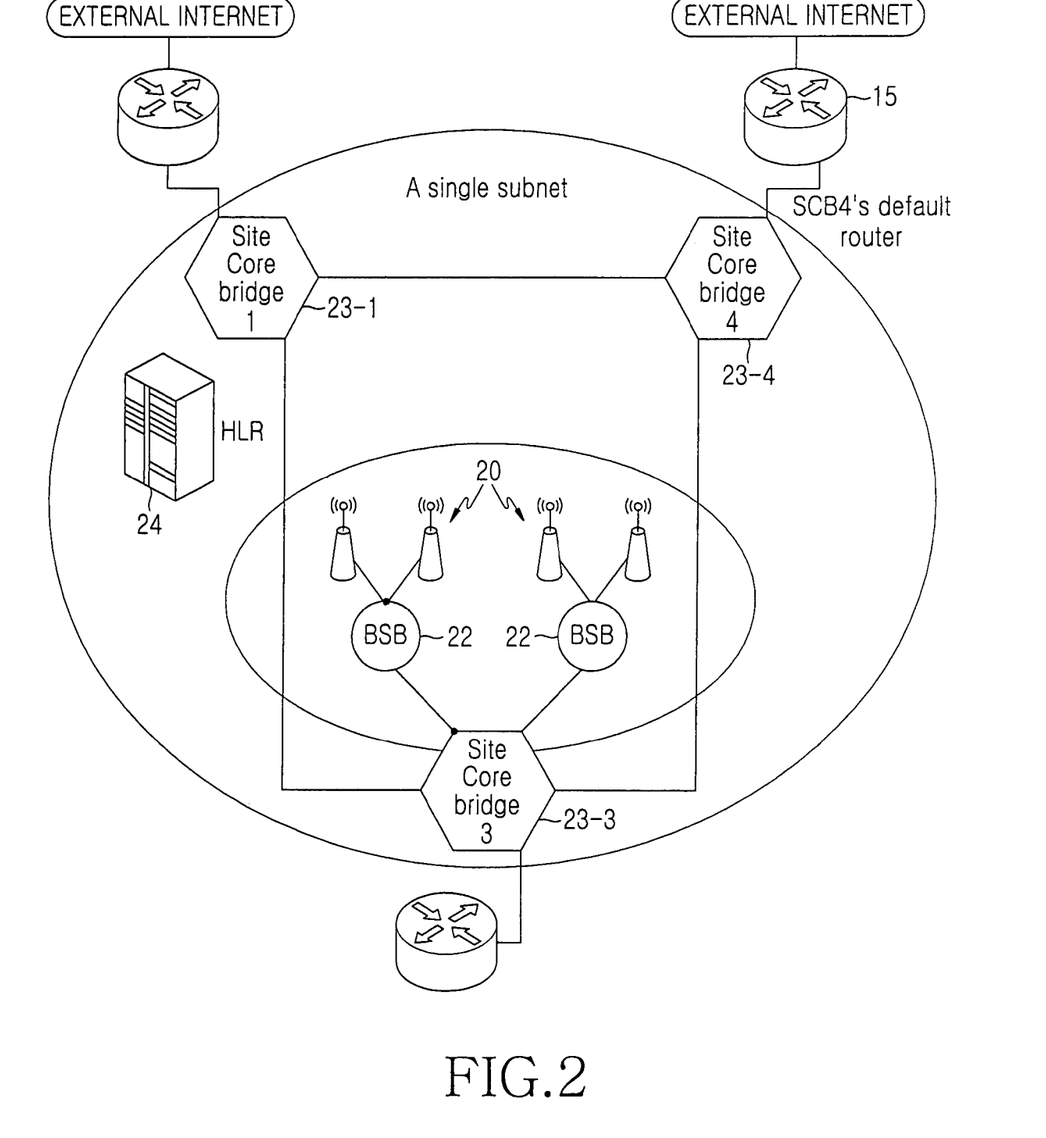
FIG. 2 is a schematic diagram for illustrating an example of the structure of a bridge-based RAS backbone network employed by the present invention.

Referring to the example shown in FIG. 2, a bridge-based RAS backbone network according to the present invention comprises mobile nodes (MN, not shown), RASs 20, BSBs (base station bridges) 22, SCBs (Site Core Bridges) 23-x, HLR (Home Location Register) 24, and external routers 15.

Each of the BSBs 22 is typically a bridge comprising a 2-tiered switch connected with the RAS 20, while each of the SCBs 23-x is a bridge comprising a 2-tiered switch constituting the core network. The HLR 24 is a server for managing the structural information of the network constituent by storing the IP address of every mobile node (MN, not shown) presently turned on, MAC (Media Access Control) address, and the address of the SCB to which the corresponding MN belongs in a table format.

In the RAS backbone network shown in FIG. 2, each SCB 23-x statically keeps the MAC address of the external default router 15 connected thereto in order to mediate the egress frame (the frame entering SCB). By statically setting the MAC address of the default router 15 in the SCB 23-x eliminates the network traffic caused by the ARP frame because it is not necessary to inquire the MAC address by means of the ARP frame.

In addition, each individual MAC address is registered in the other SCBs existing in the core network statically by employing 802.1ak MRP (Multiple Registration Protocol), or by means of an address learning function, so that each SCB eventually learns the MAC addresses of the other SCBs existing in the core network.

When each mobile terminal MN1 (shown in FIG. 3) initially accesses the network, it sends a gratuitous ARP frame enclosing its own identification information of the MAC and IP addresses to the corresponding BSB 20, so that it may be registered in the FDB (Filtering Database) of each of the bridges BSB and SCB by transmitting the ARP frame to SCB 23-2. In turn, the corresponding SCB 23-2 that received the terminal information, then sends the terminal information, including the MAC address, IP address, and SCB MAC address to the HLR 24 to register the positional and other corresponding information representing to which particular SCB does the terminal belong.

In a RAS backbone network, such as the aforementioned network, if a particular terminal transmits an ARP frame to request the MAC address of a target terminal for communication, the corresponding SCB queries the HLR 24 to have the MAC address of the target terminal delivered to the particular terminal, in response to the ARP frame. In this case, the target terminal may belong to the same SCB or a different SCB. If the target terminal does not belong to the same SCB, the corresponding SCB may get through the HLR 24 the MAC address of the SCB to which the target terminal belongs, so that frames are transferred between both SCBs in MAC-in-MAC.

Meanwhile, referring to the RAS backbone network shown in FIG. 2, if the target terminal exists in a different external network, each terminal asks the ARP for its own default gateway toward the external network. Then, the corresponding SCB provides the ARP response by using the information of the default gateway already received, enabling the terminal to communicate through the external network. In addition, when the SCB is asked by a router for the ARP for the IP address of the target terminal in the external network, the SCB connected to the external network inquires into the HLR 24 to get the MAC address of the SCB to which the target terminal belongs and the MAC address of the target terminal delivered to the router as the ARP response. Of course, the SCB connected to the external network may also, or in addition thereto, broadcast the ARP request from the router inside the network. Thus, the router gets the MAC address of the target terminal by the ARP response to normally mediate the IP packet, so that each SCB may mediate the frames to the corresponding SCB in MAC-in-MAC according to the MAC address of the target terminal already obtained and the MAC address of the SCB to which the target terminal belongs.

Still referring to FIG. 2, the RAS backbone network comprises Ethernet bridges instead of conventional routers, which helps to simplify the network so as to facilitate management of the network, and expedites the handover time because of the 2-tiered handover operation. However, the RAS backbone network as shown in FIG. 2 can suffer frame loss because the 2-tiered equipment is used to treat the handover instead of 3-tiered equipment.

Figure 3:
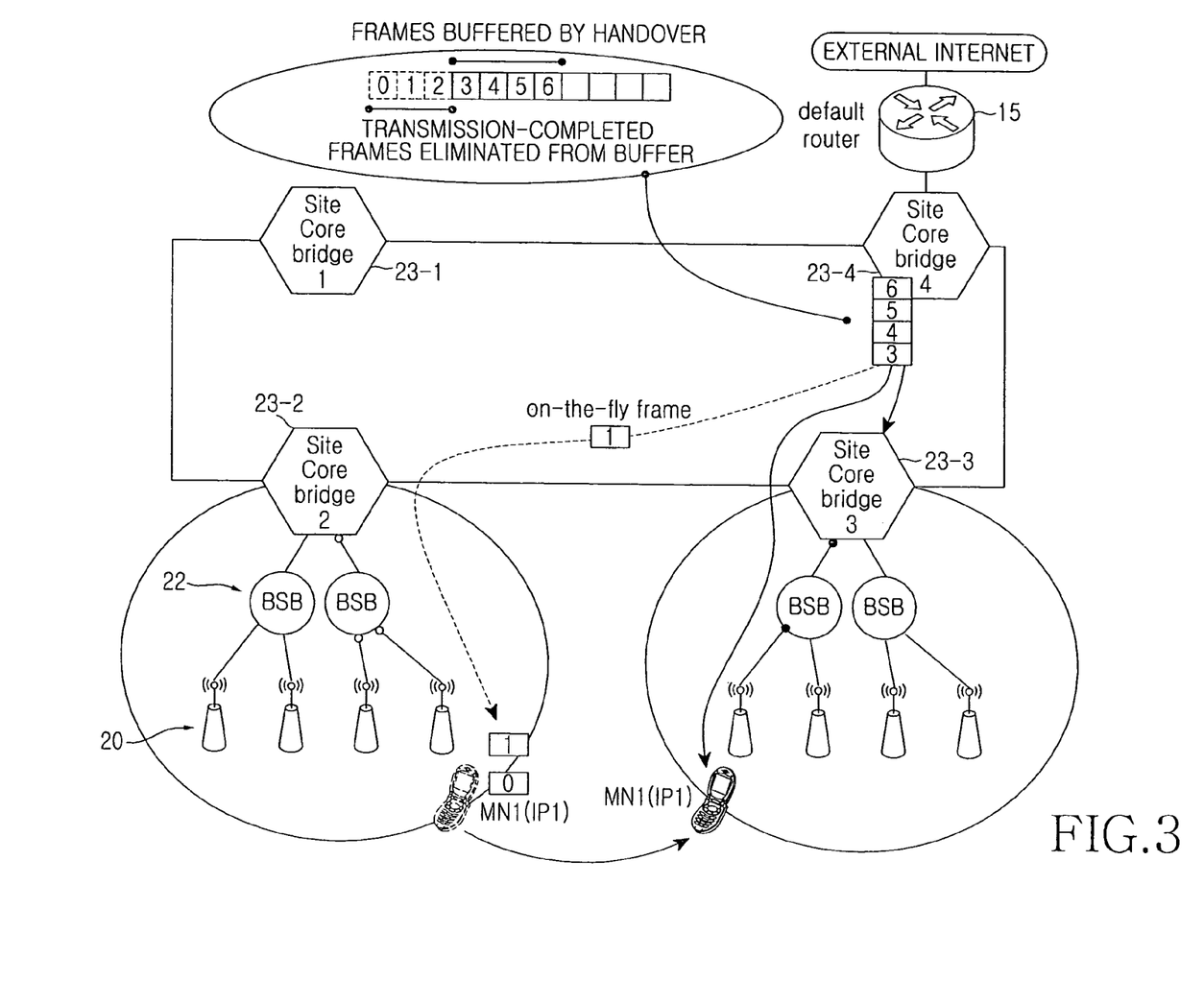
FIG. 3 is a schematic diagram for illustrating an exemplary procedure for performing a soft handover applicable in the bridge-based RAS backbone network shown in FIG. 2.

Hereinafter, in connection with FIG. 3, is described the handover operation is described in more detail.

FIG. 3 illustrates the process of performing a soft handover procedure that is applicable to a RAS backbone network such as that shown in FIG. 2. For example, the terminal MN1 moves from the second SCB 23-2 to the third SCB 23-3, and the fourth SCB 23-4 connected to the default router 15 changes also the mediation route from the second SCB 23-2 to the third SCB 23-3. If the fourth SCB 23-4 buffers the frames during the soft handover, as shown in FIG. 3, it eliminates the previously-transmitted frames from the buffer so as to buffer the frames that are newly mediated, and it would follow that the on-the-fly MAC frame being transmitted over a previous path in the network or buffered in a bridge existing in the path could be lost, as shown by the second frame [2]. Such frame loss could cause serious degradation of the communication quality in the next generation RAS network comprising small cells requiring frequent handovers. To remedy such a problem, the present invention provides a procedure for preventing the loss of the on-the-fly frame that may occur in handover in the RAS backbone network, which will be described in more detail in connection with the attached drawings.

Figure 4A:
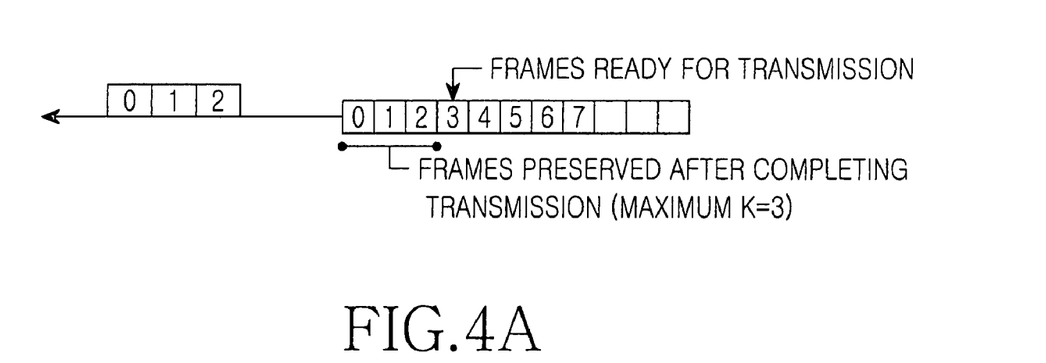
FIG. 4 is a schematic diagram for illustrating the buffering arrangement of a mediation frame transmission buffer in a bridge to perform a soft handover according to an exemplary embodiment of the present invention in the bridge-based RAS backbone network shown in FIG. 2.
Figure 4B:
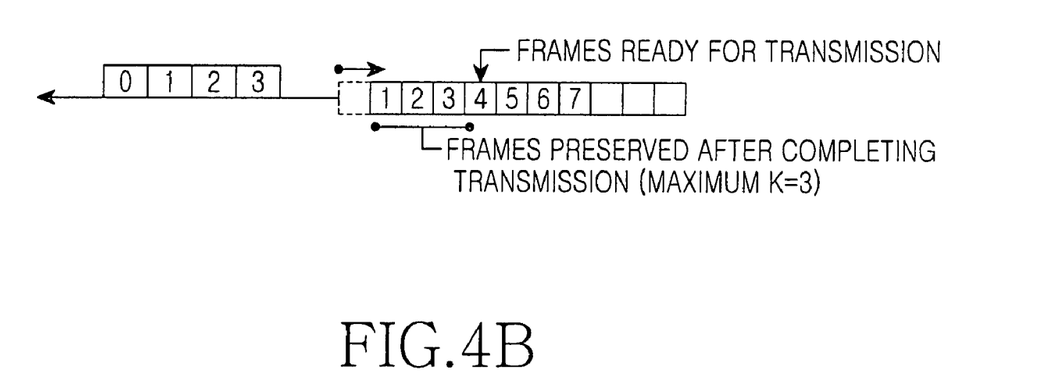

FIG. 4 shows the buffering arrangement of a mediation frame transmission buffer in a bridge to perform a soft handover according to an exemplary embodiment of the present invention in accordance with an example of the bridge-based RAS backbone network shown in FIG. 2. As described in connection with FIG. 3, in order to prevent the loss of the on-the-fly MAC frame that may occur along the previous path while the mobile node or terminal MN1 carries out a handover procedure, the inventive crossover bridge (anchor bridge) manages its own mediation buffer as follows:

First, each bridge preserves k (e.g., 3) frames that have been previously-transmitted (hereinafter referred to as "k-post" buffering).

Second, when receiving the signal indicating the handover has been completed, each bridge transmits sequentially the frames starting from the k frames arranged at the leading end of the buffer.

FIG. 4A shows an arrangement of the k-post buffering with a value of k=3. As shown in FIG. 4A, the crossover bridge preserves the frames numbered 0, 1 and 2 that have been completely transmitted. Subsequent to the completion of the transmission of the frame numbered 3, it preserves the frames numbered 1, 2 and 3, eliminating the frame numbered 0.

Figure 5:
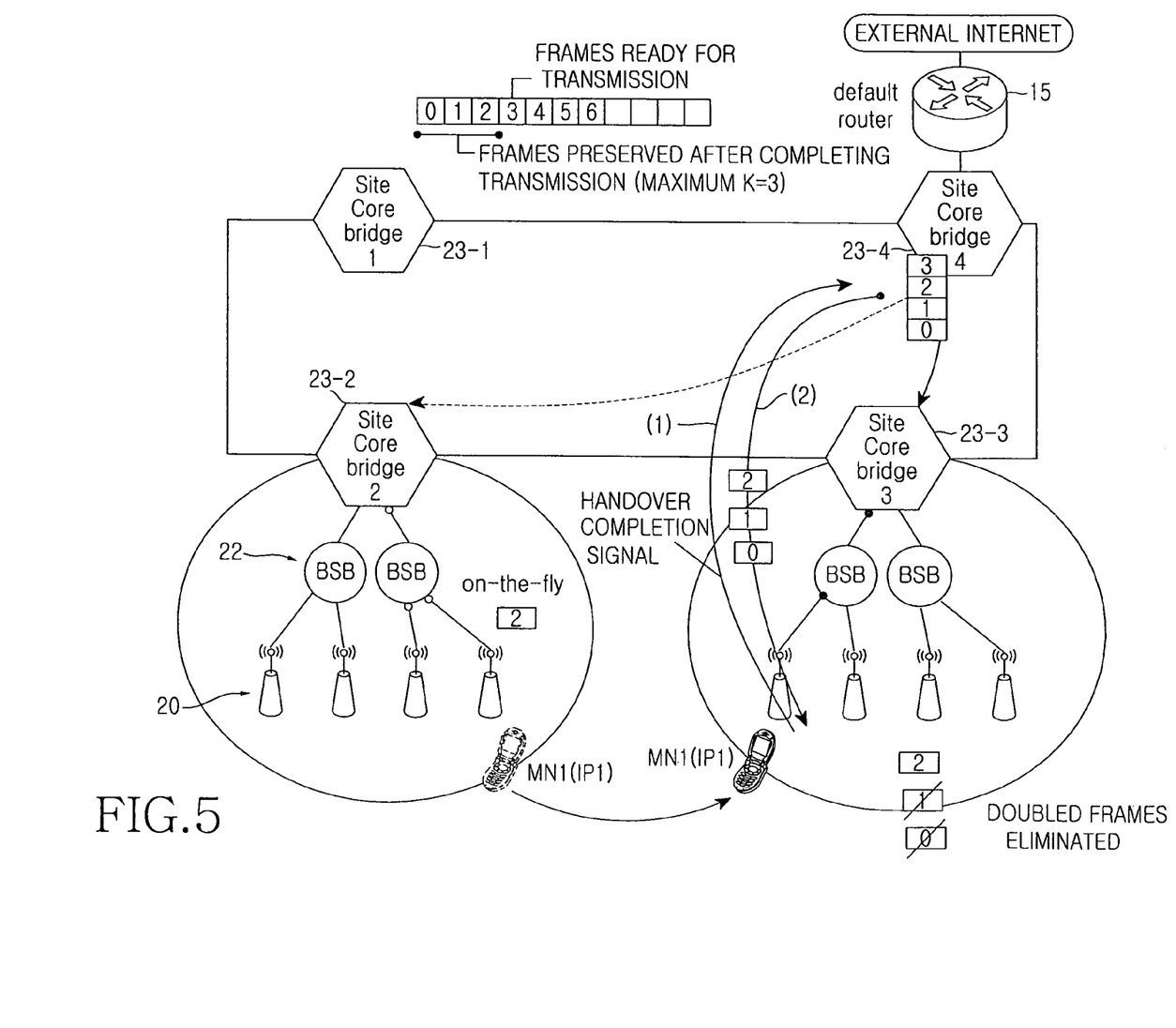
FIG. 5 is a schematic diagram for illustrating a procedure of performing a soft handover according to an exemplary embodiment of the present invention in accordance with the bridge-based RAS backbone network shown in FIG. 2.

FIG. 5 illustrates the process of performing a soft handover according to an exemplary embodiment of the present invention in accordance with the RAS backbone network of FIG. 2. Likewise as in FIG. 3, the terminal MN1 moves from the second SCB 23-2 to the third SCB 23-3, and the crossover bridge SCB 23-4 changes also the mediation route from the second SCB 23-2 to the third SCB 23-3. If the handover is completed by moving the terminal MN1 to the third SCB so as to form a link with the BSB 22, the handover completion signal is generated in step (1) and delivered through the third SCB 23-3 to the fourth SCB 23-4. Receiving the handover completion signal, the crossover bridge 23-4 retransmits the buffered frames numbered 0, 1 and 2 to the third SCB 23-3. Accordingly, even if there has occurred the loss of the on-the-fly MAC frame numbered 2, the terminal MN1 may receive the frame numbered 2 by the retransmission of the frames numbered 0, 1 and 2. Of course, the terminal MN1 receives the frames numbered 2 and onward, deleting the frames numbered 0 and 1 in order to avoid duplicity. According to the process, as described in connection with FIG. 5, the terminal may receive a doubly (i.e. a duplicate) part of the frames, but the duplicated frames are removed according to the serial numbers of an upper layer protocol, so that all the frames may be continuously received without frame loss.

Figure 6:
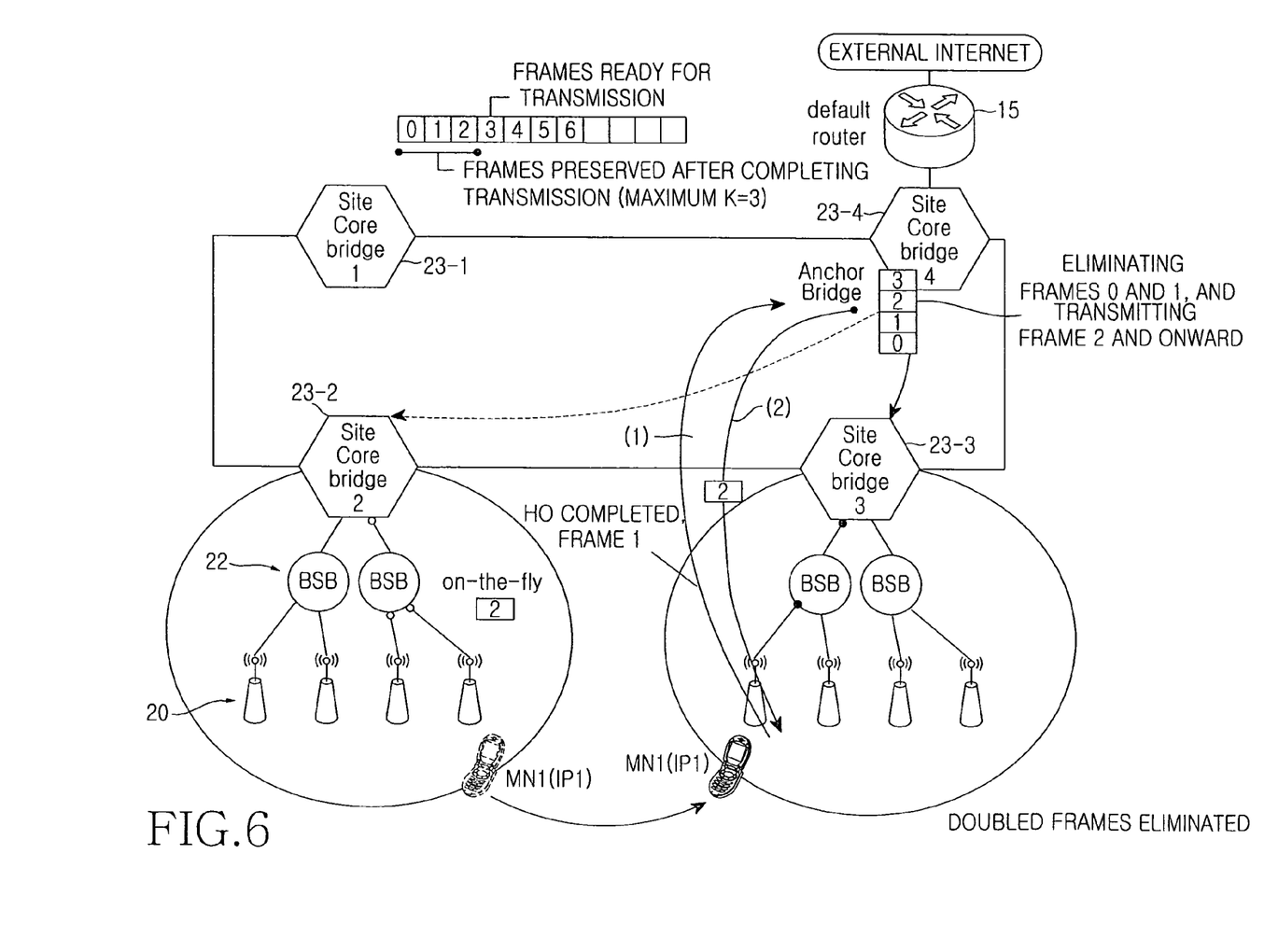
FIG. 6 is a schematic diagram for illustrating a procedure of performing a soft handover according to another exemplary embodiment of the present invention in accordance with the bridge-based RAS backbone network shown in FIG. 2.

FIG. 6 illustrates the process of performing a soft handover according to another embodiment of the present invention in the RAS backbone network of FIG. 2. Likewise, as the terminal MN1 moves, the crossover bridge SCB 23-4 changes also the mediation route from the second SCB 23-2 to the third SCB 23-3. Describing the handover operation of the terminal in connection with FIG. 6, the fourth or crossover bridge 23-4 sequentially numbers each frame in the L2 layer in order to effectively treat the doubled transmission of frames by means of the k-post buffering as shown in FIG. 5. Accordingly in step (1), the terminal MN1 records the number of the frame last received to notify the crossover bridge 23-4 of the frames having been received from the previous site (the last received frame numbered 1 in FIG. 6), so that the crossover bridge 23-4 may retransmit in step (2) the k-post buffered frames (the frame numbered 2 and onward) starting after the last received frame. In this case the crossover bridge 23-4 may delete the remaining buffered previously-transmitted frames (numbered 0 and 1).

Thus, as described in connection with FIG. 6, the crossover bridge starts to retransmit the frame with a number designated by the terminal and onward when performing handover, so that the terminal may continuously receive the frames in the 2-tiered structure without consuming the frequency band. In this case, in order that the crossover bridge can effectively transfer the buffered frames in the soft handover, the MAC frame may involve the L2 sequence number of 2 bytes for designating the frame that the terminal has last received or should continuously receive after completing the soft handover. To this end, there is required a new Etype together with adjustment of MTU (Maximum Transfer Unit) or revision of the use of the preamble. Alternatively, the ordered number may be notified by a suitable means of transferring signals between the bridges in the network. Hereinafter, description is more specifically made of the new frame type added with the L2 sequence number.

Figure 7:
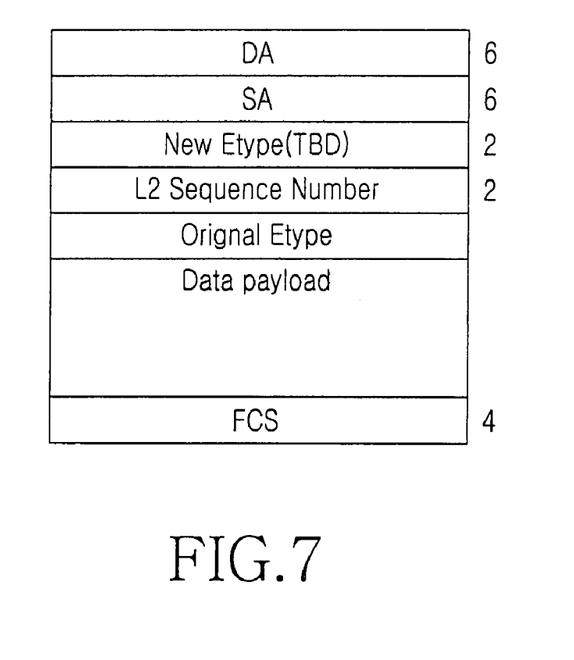
FIG. 7 is a diagram for illustrating the structure of an example of the mediation frame for the soft handover procedure shown in FIG. 6.
Figure 8:
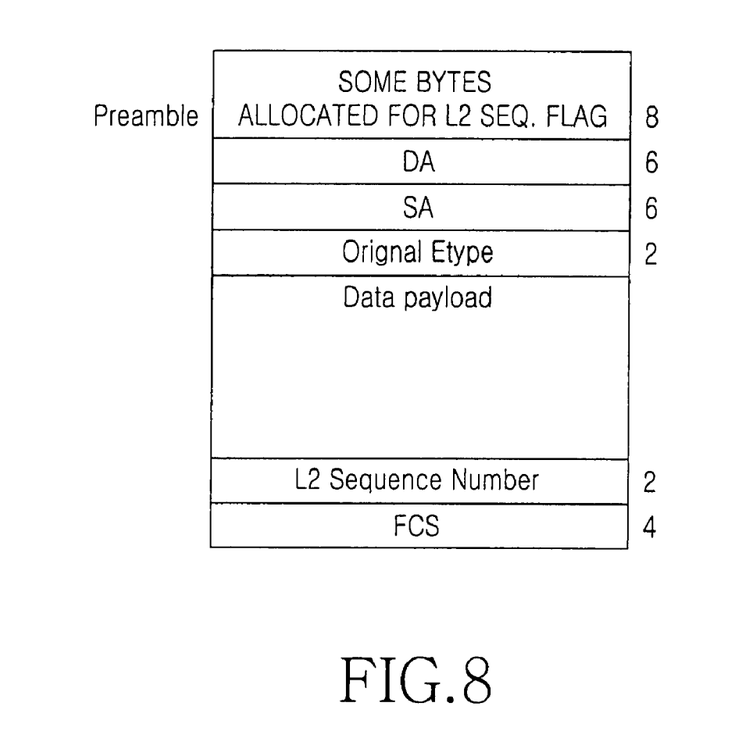
FIG. 8 is a diagram for illustrating the structure of another example of the mediation frame for the soft handover of FIG. 6.

FIGS. 7 and 8 illustrate two examples of the mediation frame for performing the soft handover according to the present invention. FIG. 7 shows the field of the L2 sequence number of 2 bytes involved in the MAC frame. In this case, a new field is added in order to notify that the frame is a new Etype added with the L2 sequence number of 2 bytes. Alternatively, FIG. 8 shows a flag of a suitable value allocated by utilizing a part of the more than 8 bytes (or bits) preamble of the MAC frame in order to notify that the MAC frame involves the L2 sequence number. In this case, the L2 sequence number may be written just before the four-byte FCS (Frame Check Sequence) the last of the DATA payload of the frame.

Thus, the invention provides a method of treating signals in a bridge-based RAS backbone network that effectively simplifies and facilitates the network control so as to achieve a fast handover without any frame loss by employing 2-tiered Ethernet bridges. While the invention has been shown and described with reference to a certain preferred embodiment thereof, it will be understood by those skilled in the art that various changes in form and details may be made therein without departing from the spirit and scope of the invention.

What is claimed is:

1. A method of treating signals in abridge-based radio access station backbone network which includes a plurality of base station bridges (BSBs) each comprised of a 2-tiered switch connected with a plurality of radio access stations, and a plurality of SCBs (Site Core Bridges) each comprised of a 2-tiered switch for constituting a core network, comprising the steps of:
   when operating as a crossover bridge, said plurality of SCBs storing in a buffer a predetermined number of previously-transmitted frames; and
   re-transmitting by said SCB selected ones of said buffered previously-transmitted frames to a terminal in response to a handover completion signal,
   wherein the buffering controlled by the SCBs comprises k-post buffering, wherein K comprises the predetermined value of previously-transmitted frames to be stored in the buffer and re-transmitted.

2. The method according to claim 1, wherein some of the frames stored in the buffer are re-transmitted during a soft handover.

3. The method as defined in claim 1, wherein the step of re-transmitting the selected frames includes sequentially transmitting all of said previously-transmitted frames from the buffer.

4. The method as defined in claim 3, wherein the terminal continuously receives all the frames without any frame loss by eliminating doubly received frames.

5. The method according to claim 4, wherein the frames are identified as doubly received frames by the terminal according to serial numbers of an upper layer protocol.

6. The method according to claim 5, wherein a MAC frame includes an L2 sequence number of 2 bytes for designating the frame that the terminal has last received or that should be continuously received by the terminal after completing the handover.

7. A method of treating signals in a bridge-based radio access station backbone network which, includes a plurality of base station bridges (BSBs) each comprised of a 2-tiered switch connected with a plurality of radio access stations, and a plurality of SCBs (Site Core Bridges) each comprised of a 2-tiered switch for constituting a core network, comprising the steps of:
   when operating as a crossover bridge, said plurality of SCBs storing in a buffer a predetermined number of previously-transmitted frames; and
   re-transmitting by said SCB selected ones of said buffered previously-transmitted frames to a terminal in response to a handover completion signal,
   wherein the step of re-transmitting the selected frames comprises transmitting the selected frames after a last frame is received by the terminal of said previously-transmitted frames stored in the buffer by checking information preset in said handover completion signal identifying the frame last received or that should be continuously received by the terminal after completing the soft handover.

8. The method according to claim. 7, wherein a MAC frame includes an L2 sequence number of 2 bytes for designating the frame that the terminal has last received or that should be continuously received by the terminal after completing the handover.

9. A method of treating signals in a bridge-based radio access station backbone network including a plurality of base station bridges (BSBs) each comprising a 2-tiered switch connected with a plurality of radio access stations, and a plurality of SCBs (Site Core Bridges) each comprising a 2-tiered switch for constituting the core network, comprising the steps of:
   when operating as a crossover bridge, each of said plurality of SCBs sequentially numbering transmitted frames with an L2 layer sequence numbers and buffering a predetermined number of previously-transmitted frames;
   generating by a terminal provided with handover service a handover completion signal added with the information identifying the frame last received or that should be continuously received after completing the handover; and
   transmitting by each of said SCBs after the last frame received by the terminal of said previously-transmitted frames from said buffer by checking the information identifying the frame last received or that should be continuously received by the terminal after completing the handover.

10. A bridge-based radio access station backbone network system, comprising:
   a plurality of base station bridges (BSBs) each comprising a 2-tiered switch connected with a plurality of radio access stations;
   a plurality of SCBs (Site Core Bridges) each comprising a 2-tiered switch for constituting a core network, said SCBs being connected with a part of said BSBs and transferring frames to each other in MAC-in-MAC connection; and
   an HLR (Handover Location Register) server for managing structural information of the network constituents by registering in table format the IP and MAC addresses of the terminals existing in the network and the addresses of said SCBs to which said terminals belong;
   wherein each of said SCBs configured for detecting a target terminal requested for communication by a terminal existing in its own site from said HLR server so as to transmit a frame to the SCB to which said target terminal belongs or to the external default router, and for buffering a predetermined number of previously-transmitted frames when operating as a crossover bridge, and re-transmitting selected ones of said buffered previously-transmitted frames to a terminal in response to a handover completion signal.

11. The system as defined in claim 10, wherein the retransmitting of the selected frames by each of said SCBs in response to the handover completion signal comprises a sequential transmission of all of said buffered previously-transmitted frames.

12. The system as defined in claim 11, comprising a buffer for storing a predetermined number of previously-transmitted frames.

13. The system as defined in claim 11, wherein the buffering comprises k-post buffering.

14. The system as defined in claim 10, wherein a means for retransmitting the selected frames by each of said SCBs includes selective transmission after a last frame is received by the terminal of said buffered previously-transmitted frames by checking the information preset in said handover completion signal identifying the frame last received or that should be continuously received by the terminal.

* * * * *